US009970680B1

(12) United States Patent
Babayan

(10) Patent No.: US 9,970,680 B1
(45) Date of Patent: May 15, 2018

(54) LEVELING BASE FOR WATER HEATER

(71) Applicant: Sarkis Shmavonovich Babayan, Grand Rapids, MI (US)

(72) Inventor: Sarkis Shmavonovich Babayan, Grand Rapids, MI (US)

(*) Notice: Subject to any disclaimer, the term of this patent is extended or adjusted under 35 U.S.C. 154(b) by 0 days. days.

(21) Appl. No.: 15/698,961

(22) Filed: Sep. 8, 2017

Related U.S. Application Data

(60) Provisional application No. 62/541,815, filed on Aug. 7, 2017.

(51) Int. Cl.
*F24H 9/06* (2006.01)
*F16M 7/00* (2006.01)

(52) U.S. Cl.
CPC ............... *F24H 9/06* (2013.01); *F16M 7/00* (2013.01); *F16M 2200/08* (2013.01)

(58) Field of Classification Search
CPC ......... F24H 9/06; F16M 7/00; F16M 2200/08
USPC ............ 248/907, 688, 650, 127, 163.1, 146, 248/346.5; 122/13.01, 19.2
See application file for complete search history.

(56) References Cited

U.S. PATENT DOCUMENTS

| | | | | |
|---|---|---|---|---|
| 1,156,814 A * | 10/1915 | Reed | ........................ | F24H 1/205 122/17.2 |
| 3,069,671 A * | 12/1962 | Taylor | ..................... | F24H 9/165 122/13.01 |
| 3,272,466 A * | 9/1966 | Sherman | ................. | B65F 1/141 248/146 |
| 3,519,233 A * | 7/1970 | Logsdon | ................... | F24H 9/06 248/146 |
| 3,802,717 A * | 4/1974 | Eitreim | ................. | B62B 5/0083 248/154 |
| 4,143,843 A * | 3/1979 | Ehrens | ..................... | F16M 7/00 248/544 |
| 4,243,194 A * | 1/1981 | Moore, Jr. | ............. | F16M 11/22 248/151 |
| 4,270,718 A * | 6/1981 | Conner, Jr. | .............. | F16M 7/00 248/188.3 |
| 4,765,360 A * | 8/1988 | Baird | ...................... | F24H 9/165 137/312 |
| 5,042,759 A * | 8/1991 | Blair | .................... | A01K 5/0142 220/228 |
| 5,188,143 A * | 2/1993 | Krebs | ..................... | F24H 9/165 122/13.01 |
| 5,791,264 A * | 8/1998 | McCraney | ................ | F24H 9/06 108/151 |

(Continued)

*Primary Examiner* — Muhammad Ijaz
(74) *Attorney, Agent, or Firm* — Oppenhuizen Law PLC; David L. Oppenhuizen

(57) ABSTRACT

A leveling base for leveling a water heater that is installed on an uneven and/or slanted surface. The water heater is placed atop the leveling base, and includes a plurality of elongated outer struts connected end-to-end to form an outer periphery. The base also includes a plurality of peripheral plates which are each used to rigidly secure together a pair of strut ends. Each peripheral plate includes a threaded rod that is connected to the peripheral plate and the lateral position of the rod with respect to the respective peripheral plate can be adjusted by rotating the rod. The lateral adjustment of each rod is used to level the leveling base. There is also a central plate positioned within the outer periphery which is connected to the outer struts by a plurality of radial struts. The central plate also includes a laterally-adjustable threaded rod.

4 Claims, 5 Drawing Sheets

(56) References Cited

U.S. PATENT DOCUMENTS

| | | | | |
|---|---|---|---|---|
| 6,135,133 | A * | 10/2000 | Ridgeway, Jr. | F24H 9/165 122/504.2 |
| 6,155,527 | A * | 12/2000 | Muyskens | B65D 19/0002 108/51.3 |
| 8,100,140 | B1 * | 1/2012 | Cantolino | F24H 9/06 137/312 |
| 2004/0251800 | A1 * | 12/2004 | O'Neil | F24H 9/06 312/245 |
| 2005/0103966 | A1 * | 5/2005 | Kim | A47B 91/024 248/346.05 |
| 2014/0048678 | A1 * | 2/2014 | Chen | F16M 7/00 248/678 |
| 2014/0312203 | A1 * | 10/2014 | He | F16M 1/00 248/677 |
| 2015/0225975 | A1 * | 8/2015 | Sugita | F16F 15/02 52/167.1 |
| 2016/0084427 | A1 * | 3/2016 | Craig | F16M 7/00 248/506 |
| 2016/0169555 | A1 * | 6/2016 | Rissler | F24H 9/02 122/19.2 |
| 2016/0186921 | A1 * | 6/2016 | Marler | B62B 3/002 248/346.5 |
| 2018/0055226 | A1 * | 3/2018 | Prince | A47B 91/024 |

\* cited by examiner

LEVELING BASE FOR WATER HEATER

BACKGROUND OF THE INVENTION

1. Field of the Invention

The present invention pertains to a universal leveling base designed to level a water heater.

2. Description of the Prior Art

Water heater manufacturers state that it is imperative for a water heater to be properly leveled during installation. However, many water heaters are installed atop uneven or slanted surfaces, such as in basements or garages.

In addition, plumbers are typically not equipped with a desirable way to level the water heaters, if it is even attempted at all. Perhaps most common, the water heater installer will place shims underneath the water heater. However, it is not particularly easy to properly level a water heater using shims.

Unfortunately, there is not a dedicated product to alleviate this problem. Thus, there remains a need for a product that will quickly, easily, and safely level a water heater atop uneven or slanted surfaces.

The present invention, as is detailed hereinbelow, seeks to provide such a product with a leveling base that can safely fully support the installed water heater and the level of the base can easily be adjusted as necessary to ensure that the water heater is safely leveled.

SUMMARY OF THE INVENTION

The present invention provides a leveling base for leveling a water heater which generally comprises:

a plurality of elongated outer struts connected end-to-end to form an outer periphery;

a plurality of peripheral plates, each of the peripheral plates being positioned at a respective end-to-end connection of each adjoining pair of outer struts, the peripheral plates including fasteners to rigidly secure the respective peripheral plate to the end of each adjoining outer strut, each peripheral plate including a threaded rod that is threadingly connected to the respective peripheral plate such that the lateral position of the rod with respect to the respective peripheral plate can be adjusted by rotating the rod with respect to the peripheral plate;

a central plate positioned within the outer periphery, and a plurality of radial struts, each of the radial struts extending from the central plate to a respective one of the peripheral plates, and the radial struts being rigidly secured on each end thereof to both the central plate and the respective peripheral plate, the central plate including a threaded rod that is threadingly connected to the central plate such that the lateral position of the rod with respect to the central plate can be adjusted by rotating the rod with respect to the central plate.

In another embodiment hereof, there is provided, in combination, a leveling base and a pan for placement below a water heater comprising:

the pan having a planar bottom surface, an open top, and at least one vertical wall extending the perimeter of the bottom surface so that the bottom surface and the wall are capable of holding a volume of water;

the leveling base having a plurality of elongated outer struts connected end-to-end to form an outer periphery;

a plurality of peripheral plates, each of the peripheral plates being positioned at a respective end-to-end connection of each adjoining pair of outer struts, the peripheral plates including fasteners to rigidly secure the respective peripheral plate to the end of each adjoining outer strut, each peripheral plate including a threaded rod that is threadingly connected to the respective peripheral plate such that the lateral position of the rod with respect to the respective peripheral plate can be adjusted by rotating the rod with respect to the peripheral plate;

a central plate positioned within the outer periphery, and a plurality of radial struts, each of the radial struts extending from the central plate to a respective one of the peripheral plates, and the radial struts being rigidly secured on each end thereof to both the central plate and the respective peripheral plate, the central plate including a threaded rod that is threadingly connected to the central plate such that the lateral position of the rod with respect to the central plate can be adjusted by rotating the rod with respect to the central plate.

Optionally, the leveling base and the pan can be arranged in which the pan is positioned atop the leveling base, or alternatively, in which the leveling base is positioned within the pan.

For a more complete understanding of the present invention, reference is made to the following detailed description and accompanying drawings. In the drawings, like reference characters refer to like parts throughout the views in which:

DETAILED DESCRIPTION OF THE PREFERRED EMBODIMENT

The leveling base 10 is designed to level a water heater, and includes custom designed assembly units with adjustable legs.

Figure 1:
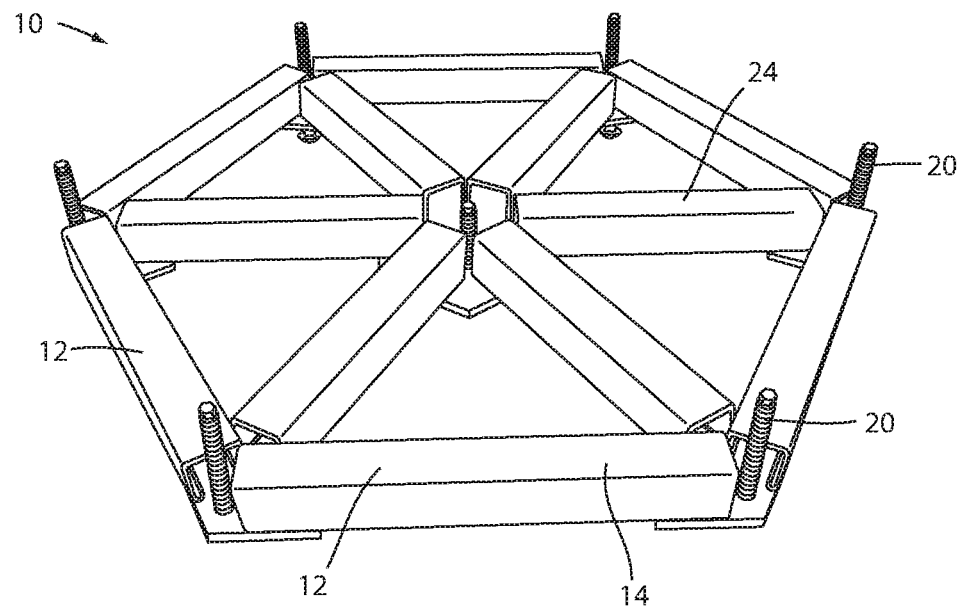
FIG. 1 is a top perspective view of a first embodiment of the present invention hereof.
Figure 2:
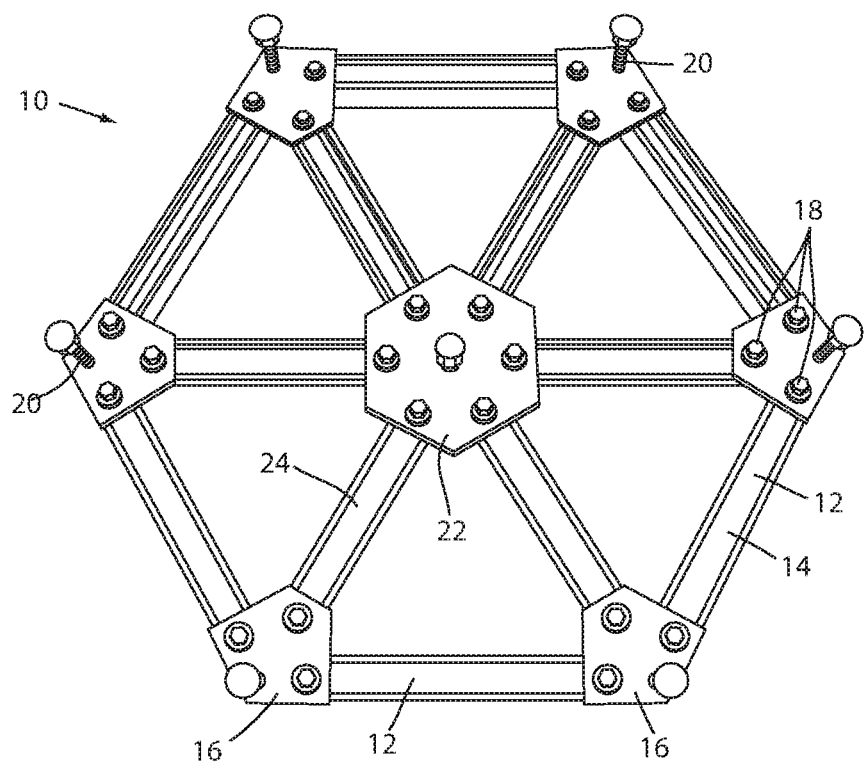
FIG. 2 is a bottom perspective view of the leveling base according to the first embodiment hereof.
Figure 3:
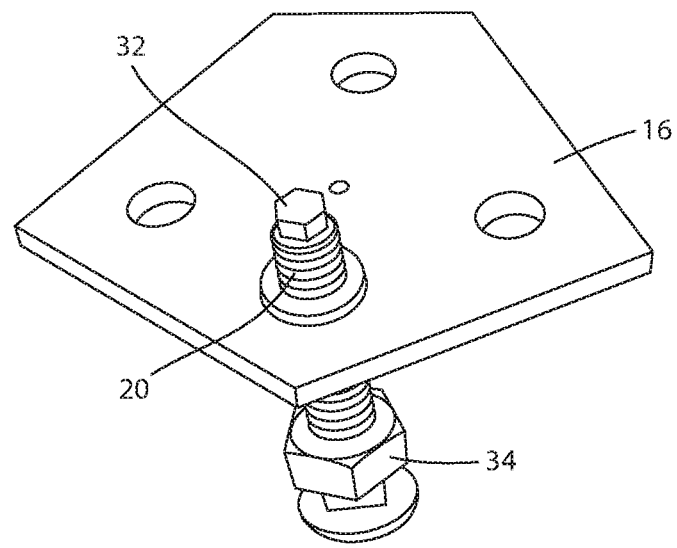
FIG. 3 shows a peripheral plate and a threaded rod which are connected by a threaded nut that is fixedly secured to the peripheral plate.
Figure 4:
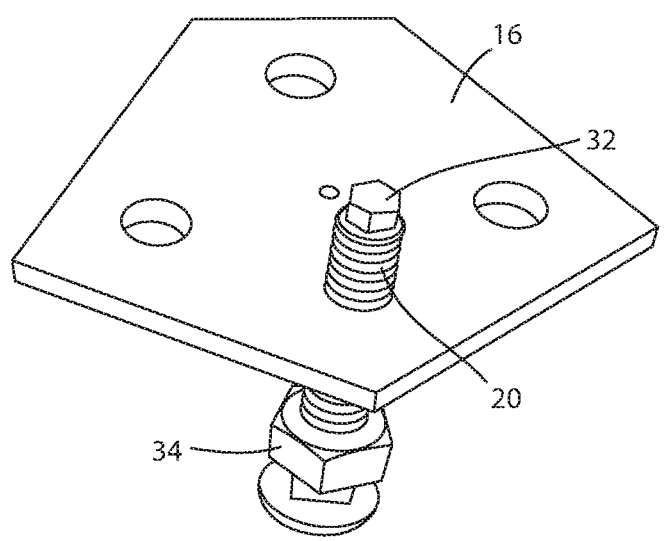
FIG. 4 shows a peripheral plate and a threaded rod in which the peripheral plate includes a threaded hole and the threaded rod is threadingly engaged in therewith.
Figure 5:
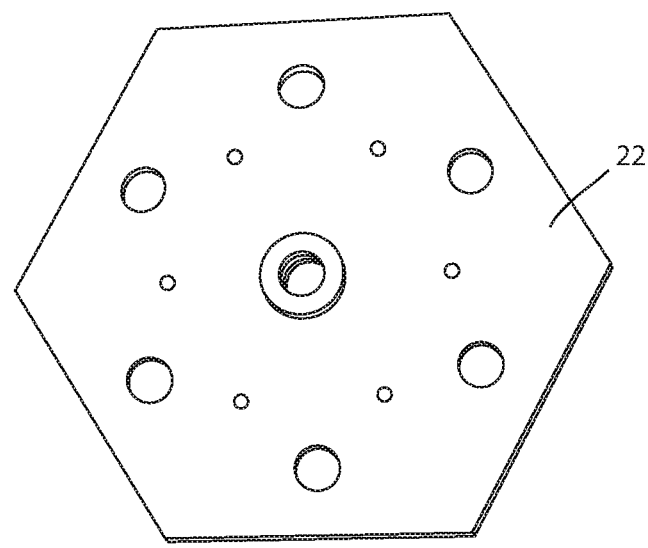
FIG. 5 shows a central plate having a threaded nut that is fixedly secured thereto.
Figure 6:
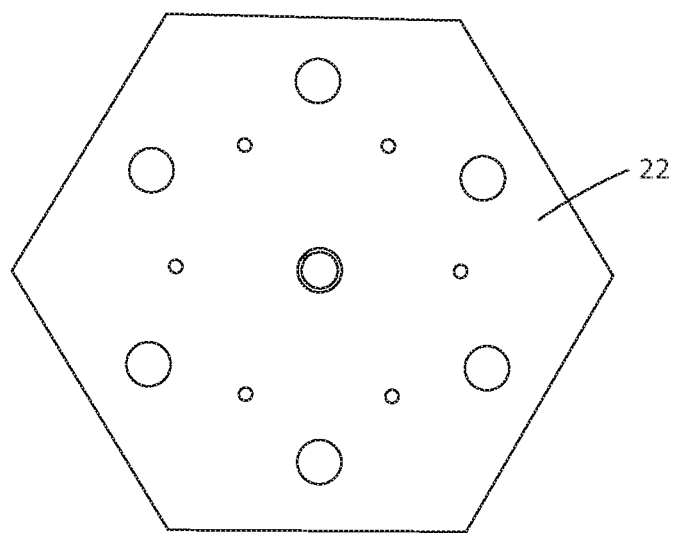
FIG. 6 shows a central plate having a threaded hole for receiving a threaded rod.

In accordance with the present invention, and as shown generally in FIG. 1, there is provided a leveling base 10 for leveling a water heater which generally comprises:

a plurality of elongated outer struts 12 connected end-to-end to form an outer periphery 14;

a plurality of peripheral plates 16, each of the peripheral plates 16 being positioned at a respective end-to-end connection of each adjoining pair of outer struts 12, the peripheral plates 16 including fasteners 18 to rigidly secure the respective peripheral plate 16 to the end of each adjoining outer strut, each peripheral plate 16 including a threaded rod 20 that is threadingly connected to the respective peripheral plate 16 such that the lateral position of the rod 20 with respect to the respective peripheral plate 16 can be adjusted by rotating the rod 20 with respect to the peripheral plate 16;

a central plate 22 positioned within the outer periphery 14, and a plurality of radial struts 24, each of the radial struts 24 extending from the central plate 22 to a respective one of the peripheral plates 16, and the radial struts 24 being rigidly secured on each end thereof to both the central plate 22 and the respective peripheral plate 16, the central plate 22 including a threaded rod 20 that is threadingly connected to the central plate 22 such that the lateral position of the rod with respect to the central plate 22 can be adjusted by rotating the rod with respect to the central plate 22.

In another embodiment hereof, there is provided, in combination, a leveling base 10 and a pan 26 for placement below a water heater comprising:

the pan 26 having a planar bottom surface 28, an open top, and at least one vertical wall 30 extending the perimeter of the bottom surface 28 so that the bottom surface 28 and the wall 30 are capable of holding a volume of water;

the leveling base 10 having a plurality of elongated outer struts 12 connected end-to-end to form an outer periphery 14;

a plurality of peripheral plates 16, each of the peripheral plates 16 being positioned at a respective end-to-end connection of each adjoining pair of outer struts 12, the peripheral plates 16 including fasteners 18 to rigidly secure the respective peripheral plate 16 to the end of each adjoining outer strut 12, each peripheral plate 16 including a threaded rod 20 that is threadingly connected to the respective peripheral plate 16 such that the lateral position of the rod 20 with respect to the respective peripheral plate 16 can be adjusted by rotating the rod 20 with respect to the peripheral plate 16;

a central plate 22 positioned within the outer periphery 14, and a plurality of radial struts 24, each of the radial struts 24 extending from the central plate 22 to a respective one of the peripheral plates 16, and the radial struts 24 being rigidly secured on each end thereof to both the central plate 22 and the respective peripheral plate 16, the central plate 22 including a threaded rod 20 that is threadingly connected to the central plate 22 such that the lateral position of the rod 20 with respect to the central plate 22 can be adjusted by rotating the rod 20 with respect to the central plate 22.

Optionally, the leveling base 10 and the pan 26 can be arranged in which the pan 26 is positioned atop the leveling base 10, or alternatively, in which the leveling base 10 is positioned within the pan 26.

Although the leveling base 10 is shown as a hexagon throughout the drawings, it is to be appreciated by one having ordinary skill in the art that the leveling base 10 can be circular, rectangular, octagonal, or any other suitable shape as desired. As shown in the drawings, the leveling base 10 is preferably hexagonal.

The leveling base 10 is preferably formed from elongated unistrut channels which generally have a U-shaped cross-section. Even more preferably, the size of the unistrut channels is 1⅝" (inches). The length of each unistrut channel, or strut 12, is generally determined upon the number of struts 12 provided (i.e., whether the leveling base 10 is hexagonal, octagonal, rectangular, etc.), and the diameter of the water heater. One having ordinary skill in the art can determine the appropriate length of each strut 12 based upon these factors.

The ends of the struts are secured to one another using the peripheral plates 16 and appropriate fasteners 18. Preferably, the peripheral plates 16 are ¼ inch thick and formed from a corrosion-resistant material, such as galvanized steel. A threaded rod 20 is threadingly secured to the peripheral plate 16. The peripheral plate 16 can include a threaded hole dimensioned to receive the threaded rod 20. Alternatively, the peripheral plate 16 can include a through-hole, and a threaded nut is fixedly secured in the hole, such as by welding or by being press-fit. Again, the threaded nut is dimensioned to receive the threaded rod 20.

In either instance, the leveling base 10 is positioned on a floor surface with the head of the threaded rod 20 on the floor. The struts and peripheral plates 16 are positioned above the head of the threaded rod 20, and are elevated from the ground. The leveling base 10 is leveled by threadingly adjusting each of the threaded rods 20, and the lateral position of the threaded rod 20 is used to compensate for uneven or slanted ground surfaces. Optionally, the end of the threaded rod 20 opposite the head can include a bit 32 for being inserted into a wrench to make it easier to turn the rod 20.

Preferably, the end of the threaded rod 20 that abuts the ground surface has a flange, such as with a carriage bolt.

Figure 7:
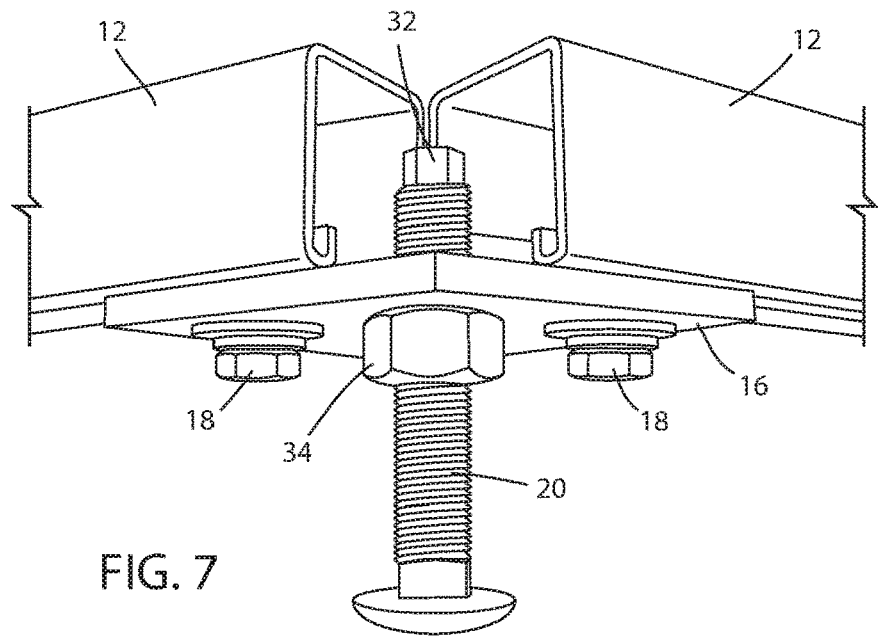
FIG. 7 shows an enlarged view of a threaded rod threadingly secured to a peripheral plate.
Figure 8:
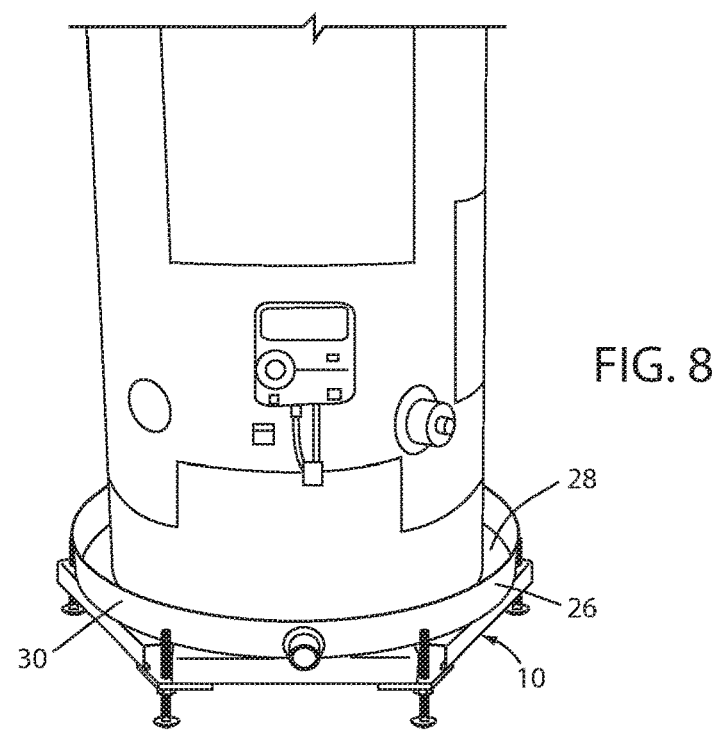
FIG. 8 shows a water heater placed inside a pan atop the leveling base.
Figure 9:
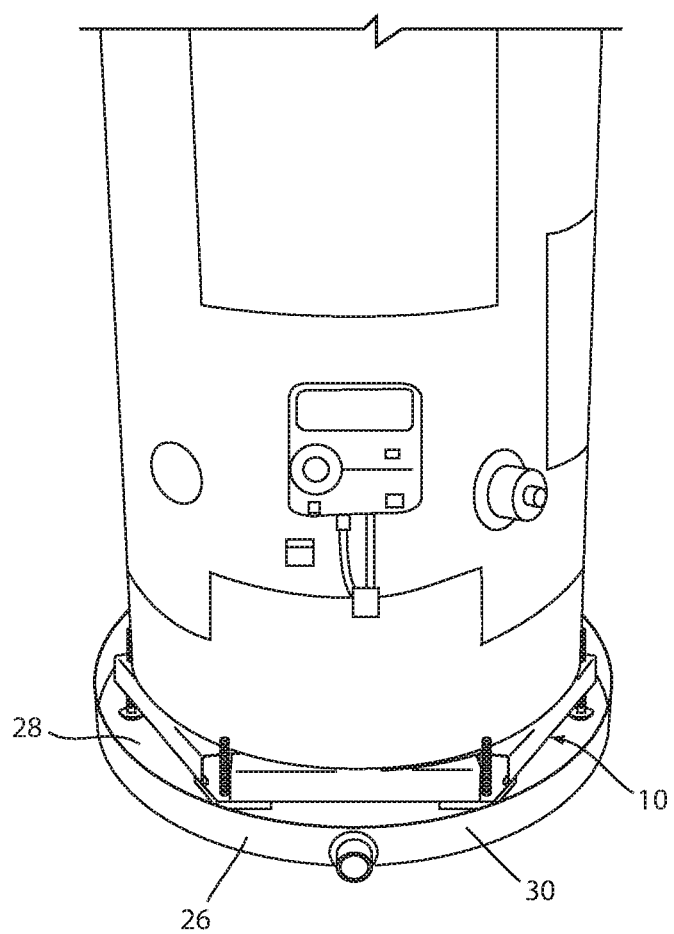
FIG. 9 shows a water heater placed atop the leveling base which is inside the pan.

Optionally, and as shown in FIG. 7, the threaded rod 20 can also include a lock nut 34 that is threadingly engaged with the threaded rod 20. Once the threaded rod 20 is adjusted with respect to the peripheral plate 16, then the lock nut 34 is rotated to engage firmly against the peripheral plate 16, thereby rotatably locking the position of the threaded rod 20. In this regard, the threads on the lock nut 34 also carry a portion of the load of the water heater.

The central plate 22 includes a plurality of holes for receiving fasteners 18 to secure the ends of the radial struts 24 to the central plate 22. Any suitable type of fastener can be used, such as a bolt and a threaded plate that fits within the unistrut channel. Similar to the peripheral plates 16, the central plate 22 is preferably ¼" (inch) thick and formed from a corrosion-resistant material, such as galvanized steel. The central plate 22 also includes a centrally-located hole for receiving a threaded rod 20. This threaded rod 20 adds additional support to the leveling base 10.

There are several benefits of the leveling base 10. First, as mentioned above, the leveling base 10 makes it easy to level and water heater on any kind of uneven or slanted surface that is reasonably suitable for installing a water heater. Next, this also elevates the water heater from the ground surface, which is important for protection from any elements on the ground.

Lastly, although not discussed above, it is common within the water heater and plumbing industry to install a water heater inside the pan 26 as a preventative measure for a leaking water heater. The pan 26 preferably includes a drain hose which directs any water inside the pan 26 to and down the drain. This is a safety precaution. However, the volume of water that the pan 26 is capable of holding is significantly limited when the water heater itself is placed within the pan 26 because the water heater displaces the majority of volume within the pan 26. Therefore, an additional benefit of the leveling base 10 is when the leveling base 10 is positioned within the pan 26, thus elevating the water heater so that it does not displace any unnecessary volume within the pan 26.

According to the invention described above, a leveling base is provided for leveling a water heater to allow the water heater to be installed safely on any uneven or slanted surface.

What is claimed is:
1. A leveling base comprising:
  a plurality of elongated outer struts connected end-to-end to form an outer periphery;
  a plurality of peripheral plates, each of the peripheral plates being positioned at a respective end-to-end connection of each adjoining pair of outer struts, the peripheral plates including fasteners to rigidly secure the respective peripheral plate to the end of each adjoining outer strut, each peripheral plate including a threaded rod that is threadingly connected to the respective peripheral plate such that a lateral position of the rod with respect to the respective peripheral plate can be adjusted by rotating the rod with respect to the peripheral plate;

a central plate positioned within the outer periphery, and a plurality of radial struts, each of the radial struts extending from the central plate to a respective one of the peripheral plates, and the radial struts being rigidly secured on each end thereof to both the central plate and the respective peripheral plate, the central plate including a threaded rod that is threadingly connected to the central plate such that a lateral position of the rod with respect to the central plate can be adjusted by rotating the rod with respect to the central plate.

2. In combination, a leveling base and a pan for placement below a water heater comprising:

the pan having a planar bottom surface, an open top, and at least one vertical wall extending upwardly from the perimeter of the bottom surface so that the bottom surface and the wall are capable of holding a volume of water;

the leveling base having a plurality of elongated outer struts connected end-to-end to form an outer periphery;

a plurality of peripheral plates, each of the peripheral plates being positioned at a respective end-to-end connection of each adjoining pair of outer struts, the peripheral plates including fasteners to rigidly secure the respective peripheral plate to the end of each adjoining outer strut, each peripheral plate including a threaded rod that is threadingly connected to the respective peripheral plate such that a lateral position of the rod with respect to the respective peripheral plate can be adjusted by rotating the rod with respect to the peripheral plate;

a central plate positioned within the outer periphery, and a plurality of radial struts, each of the radial struts extending from the central plate to a respective one of the peripheral plates, and the radial struts being rigidly secured on each end thereof to both the central plate and the respective peripheral plate, the central plate including a threaded rod that is threadingly connected to the central plate such that a lateral position of the rod with respect to the central plate can be adjusted by rotating the rod with respect to the central plate.

3. The leveling base and pan of claim 2 in which the pan is positioned atop the leveling base.

4. The leveling base and pan of claim 2 in which the leveling base is positioned inside the pan.

\* \* \* \* \*